US012723741B2

(12) United States Patent
Chen et al.

(10) Patent No.: US 12,723,741 B2
(45) Date of Patent: Sep. 1, 2026

(54) EASY-TO-MOUNT/DISMOUNT RECESSED BORDERLESS SPOTLIGHT STRUCTURE

(71) Applicant: Wuxi Seastar Lighting Co., Ltd., Wuxi (CN)

(72) Inventors: Qian Chen, Wuxi (CN); Xingchao Dou, Wuxi (CN); Zhihui Huang, Wuxi (CN); Xinrong Sha, Wuxi (CN); Jiyong Liu, Wuxi (CN)

(73) Assignee: Wuxi Seastar Lighting Co., Ltd., Wuxi (CN)

( * ) Notice: Subject to any disclaimer, the term of this patent is extended or adjusted under 35 U.S.C. 154(b) by 0 days.

(21) Appl. No.: 19/232,723

(22) Filed: Jun. 9, 2025

(65) Prior Publication Data

US 2025/0305662 A1 Oct. 2, 2025

(30) Foreign Application Priority Data

Aug. 12, 2024 (CN) ......................... 202411100376.X

(51) Int. Cl.

*F21V 19/00* (2006.01)
*F21S 8/02* (2006.01)
*F21V 21/04* (2006.01)
*F21V 29/70* (2015.01)

(52) U.S. Cl.

CPC ............ *F21V 19/0055* (2013.01); *F21S 8/02* (2013.01); *F21V 21/04* (2013.01); *F21V 29/70* (2015.01)

(58) Field of Classification Search

CPC ......... F21V 19/0055; F21V 21/04; F21S 8/02
See application file for complete search history.

(56) References Cited

U.S. PATENT DOCUMENTS

| | | | | |
|---|---|---|---|---|
| 10,753,558 | B2 * | 8/2020 | Danesh | F21V 21/048 |
| 11,435,064 | B1 * | 9/2022 | Danesh | F21V 21/04 |
| 2009/0080189 | A1 * | 3/2009 | Wegner | H05B 45/382 362/249.02 |
| 2014/0063810 | A1 * | 3/2014 | Randolph | F21V 7/0091 362/294 |
| 2016/0348861 | A1 * | 12/2016 | Bailey | F21V 7/28 |
| 2019/0032902 | A1 | 1/2019 | Kim et al. | |
| 2020/0032987 | A1 | 1/2020 | Stark et al. | |
| 2020/0132278 | A1 * | 4/2020 | Portinga | F21V 15/01 |
| 2020/0149715 | A1 | 5/2020 | Zeman | |
| 2020/0348001 | A1 * | 11/2020 | Spicer | F21K 9/20 |
| 2021/0356110 | A1 * | 11/2021 | Zhang | F21V 15/01 |

FOREIGN PATENT DOCUMENTS

CN 217131087 * 8/2022

OTHER PUBLICATIONS

Machine translation of CN217131087 (Year: 2022).*

* cited by examiner

*Primary Examiner* — Leah Macchiarolo

(57) ABSTRACT

An easy-to-mount/dismount recessed borderless spotlight structure includes: a front ring, where a guide slot is provided in the front ring; and a recessed borderless spotlight module, where the recessed borderless spotlight module includes a fixed recessed borderless spotlight module and a recessed borderless spotlight module with a function of adjusting a light outgoing angle. The recessed borderless spotlight module is configured to rotate along a path of the guide slot, and is nested in the front ring. According to the present disclosure, the problems in the conventional technology can be effectively resolved, and a high economic value can be achieved.

2 Claims, 12 Drawing Sheets

EASY-TO-MOUNT/DISMOUNT RECESSED BORDERLESS SPOTLIGHT STRUCTURE

CROSS-REFERENCE TO RELATED APPLICATIONS

This application claims priority to Chinese Patent Application No. 202411100376.X with a filing date of Aug. 12, 2024. The content of the aforementioned application, including any intervening amendments thereto, is incorporated herein by reference.

TECHNICAL FIELD

The present disclosure belongs to the field of spotlight lighting technologies, and in particular, relates to an easy-to-mount/dismount recessed borderless spotlight structure.

BACKGROUND

A recessed borderless spotlight, as a more attractive supplementary lighting than a conventional spotlight, is commonly used in a commercial place, a residential place, and other places. The recessed borderless spotlight is usually fastened to a ceiling. A layer of decorative paint is coated on the ceiling to cover and hide a frame of the spotlight, to achieve a frameless visual effect. At present, the recessed borderless spotlight is usually fastened to the celling through a spring or a spring plate. The spring or the spring plate is difficult to dismount, and therefore, there is a specific safety hazard. In addition, most of recessed borderless spotlight are integrated, and cannot be replaced and mounted in a modular manner. This affects further use and marketing promotion of the recessed borderless spotlight.

SUMMARY OF PRESENT INVENTION

To resolve the technical problems, the inventor develops an easy-to-mount/dismount recessed borderless spotlight structure according to rich experience in the field of spotlight lighting technologies.

To achieve the objective, the present disclosure adopts the following technical solution: An easy-to-mount/dismount recessed borderless spotlight structure includes: a front ring, where a guide slot is provided in the front ring; and a recessed borderless spotlight module, where the recessed borderless spotlight module includes a fixed recessed borderless spotlight module and a recessed borderless spotlight module with a function of adjusting a light outgoing angle; the recessed borderless spotlight module is configured to rotate along a path of the guide slot, and is nested in the front ring, and the fixed recessed borderless spotlight module includes a first wire, a first heat sink, a first chip-on-board (COB) lamp bead, a first COB holder, a first screw, a reflective sheet, a lens, a first retaining ring, and a first wire clip; and the recessed borderless spotlight module with a function of adjusting a light outgoing angle includes a second wire, a second heat sink, a second COB lamp bead, a second COB holder, a second screw, a second lens, a ball body, a second wire clip, a reflector cup, an O-shaped ring, and a second retaining ring.

Further, a top of the first wire passes through a wire hole of the first heat sink to extend upward, an extended part of the first wire is clamped by the first wire clip and is locked by the first screw, and a bottom of the first wire is soldered with the first COB lamp bead through tin soldering; the first COB lamp bead is pre-fastened to the first COB holder through a clip fastener, the first COB holder is pushed into the first heat sink, the first COB holder is locked through the first screw, then, the reflective sheet and a first lens are sequentially mounted, and the first retaining ring is snapped into the first heat sink, to complete assembling; and a first protrusion is disposed on the first heat sink.

Further, a top of the second wire passes through a wire hole of the second heat sink, an extended part of the second wire is clamped by the second wire clip, and is locked by the second screw, a bottom of the second wire is soldered with the second COB lamp bead through tin soldering, the second COB lamp bead is clamped by the second COB holder, and the second COB holder is locked by the second screw; and the second lens is vertically placed in the ball body, and the second heat sink is tightened with the ball body through threads; the ball body is vertically placed on the reflector cup, and then, the O-shaped ring and the second retaining ring are sequentially sleeved on the ball body, and are locked through the second screw, to complete assembling; and a second protrusion is disposed on the second heat sink.

Further, the second protrusion is configured to rotate a plurality of times along the path of the guide slot of the front ring, and the fixed recessed borderless spotlight module is nested in the front ring; and the second protrusion is configured to rotate a plurality of times along the path of the guide slot of the front ring, and the recessed borderless spotlight module with a function of adjusting a light outgoing angle is nested in the front ring.

Further, the ceiling is perforated, the front ring is fastened to the ceiling through a bolt, and the front ring is covered and hidden by using decorative paint.

Further, the recessed borderless spotlight module is die-cast through a die-casting mold.

Compared with the conventional technology, the present disclosure has the following beneficial effects:

1. The structure is mounted in a manner in which the front ring is pre-embedded and then the spotlight module is mounted during decoration, reducing damages to the spotlight during decoration by the user. When the lamp is damaged or has another condition, the spotlight module can be directly replaced. The front ring can be shared by the two spotlight modules, and the two spotlight modules can replace each other without dismounting the front ring, reducing costs caused by re-decoration, saving user costs, enhancing operability, facilitating marketing promotion of the recessed borderless spotlight, and creating good economic benefits.
2. In this structure, the front ring and the spotlight module are rotatably mounted, facilitating mounting, and effectively preventing a potential safety hazard of dropping when the spotlight module is replaced in the conventional technology.

Figure 1:
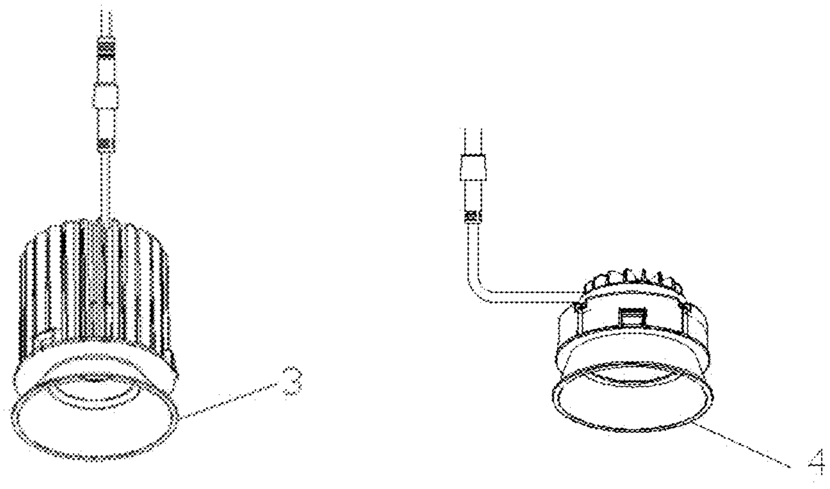
FIG. 1 is a schematic diagram of a fixed recessed borderless spotlight module and a recessed borderless spotlight module with a function of adjusting a light outgoing angle.
Figure 2:
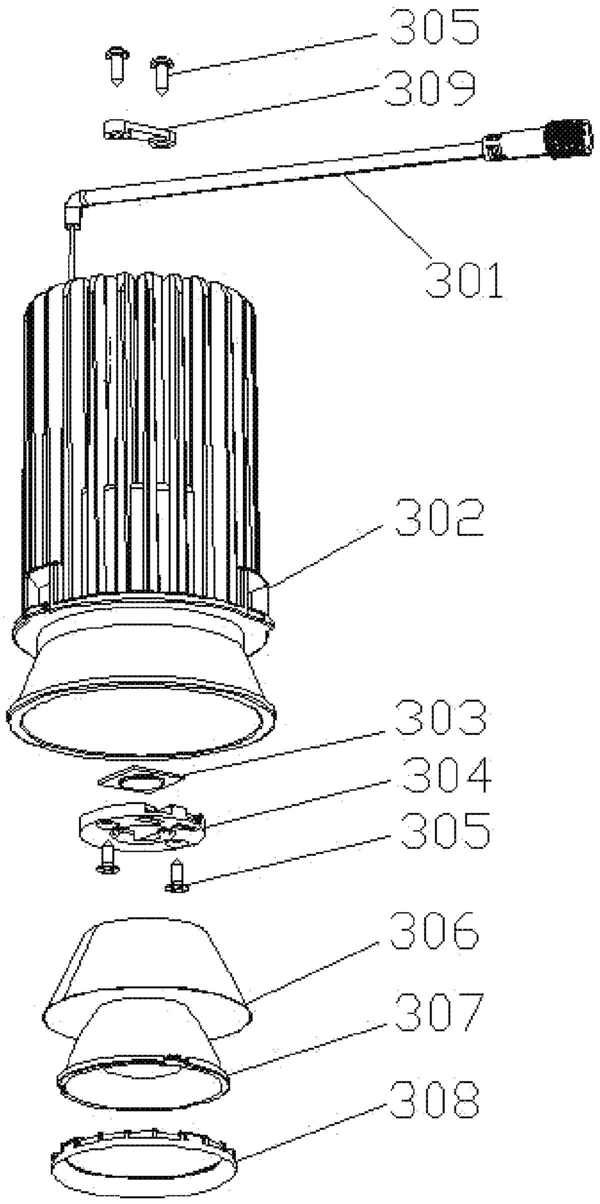
FIG. 2 is a schematic exploded view of a fixed recessed borderless spotlight module.
Figure 3:
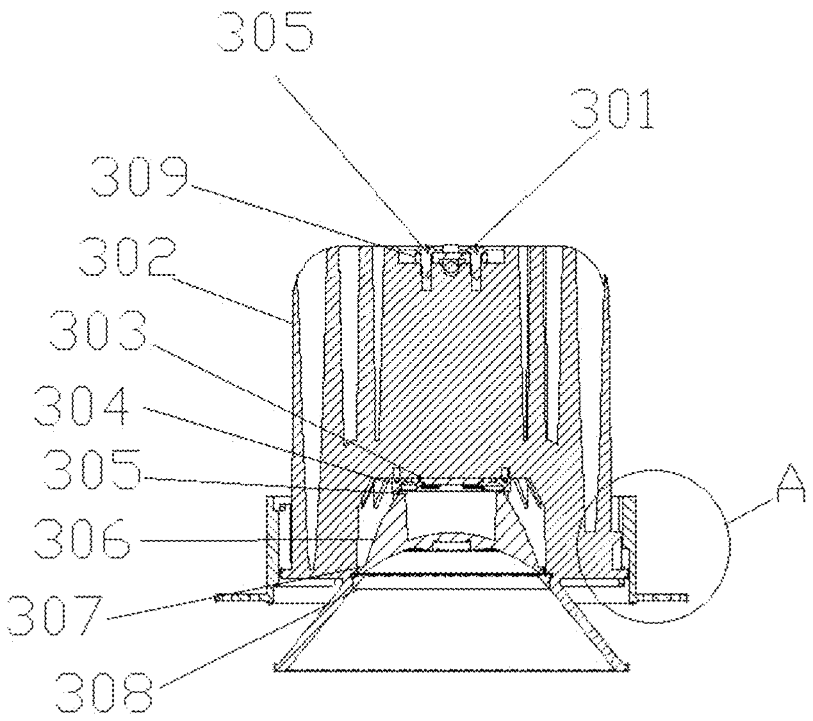
FIG. 3 is a sectional view of a fixed recessed borderless spotlight module.
Figure 4:
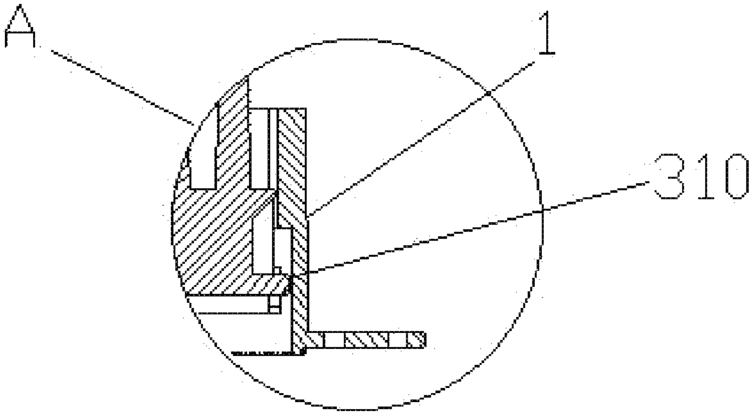
FIG. 4 is a schematic enlarged view of a part A.
Figure 5:
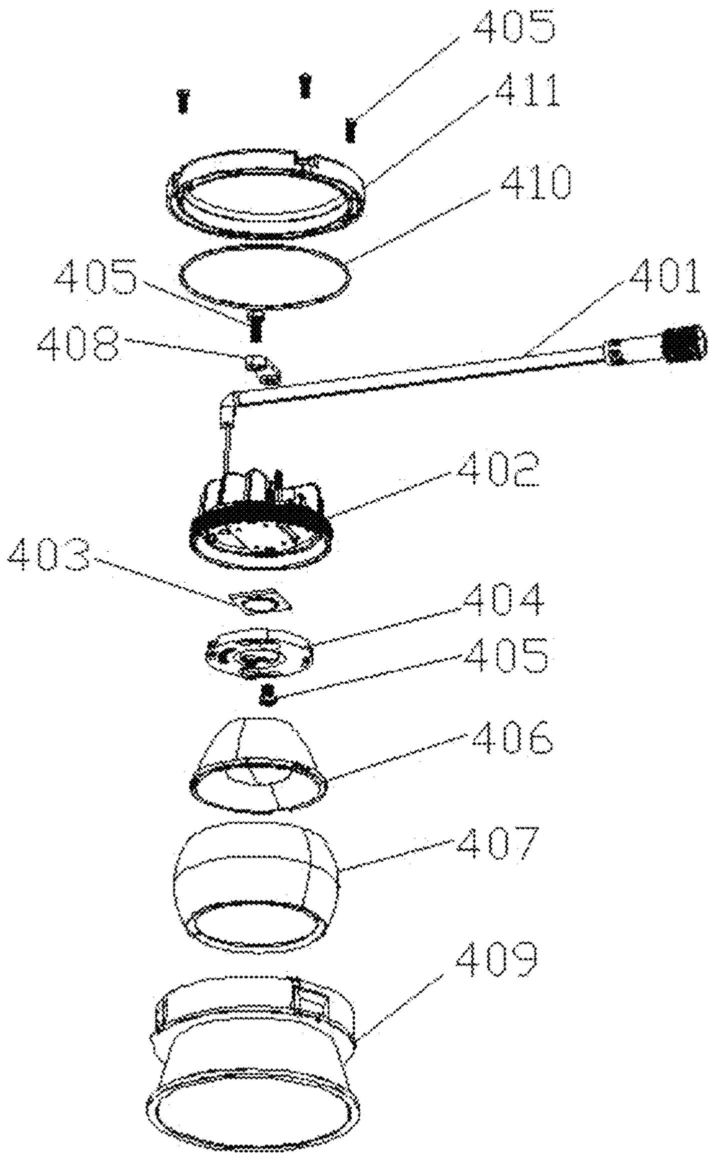
FIG. 5 is a schematic exploded diagram of a recessed borderless spotlight module with a function of adjusting a light outgoing angle.
Figure 6:
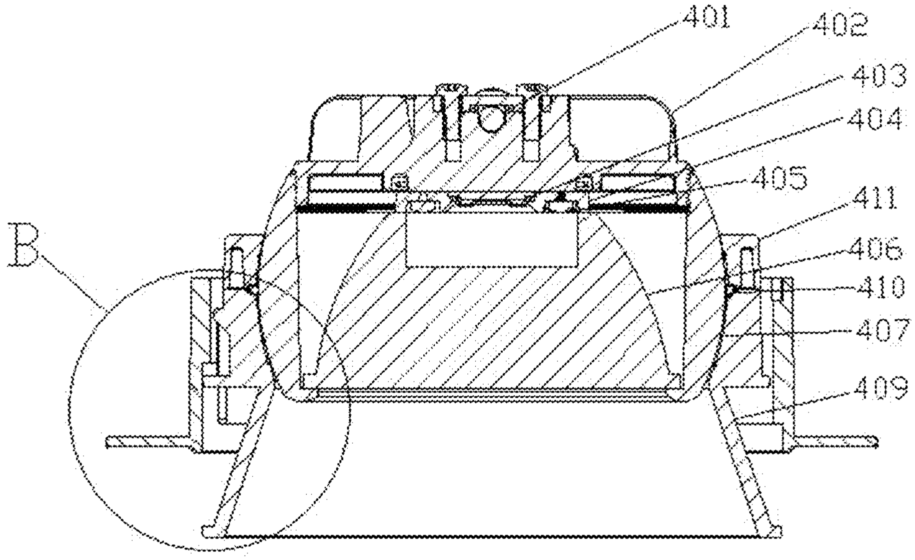
FIG. 6 is a sectional view of a recessed borderless spotlight module with a function of adjusting a light outgoing angle.
Figure 7:
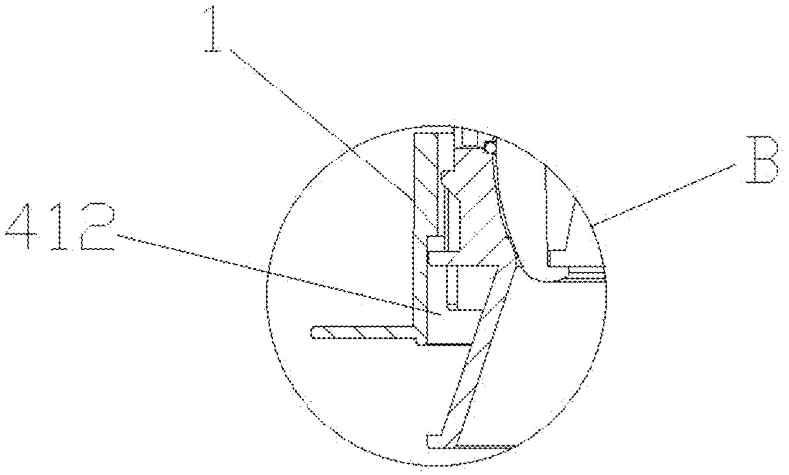
FIG. 7 is a schematic enlarged view of a part B.
Figure 8:
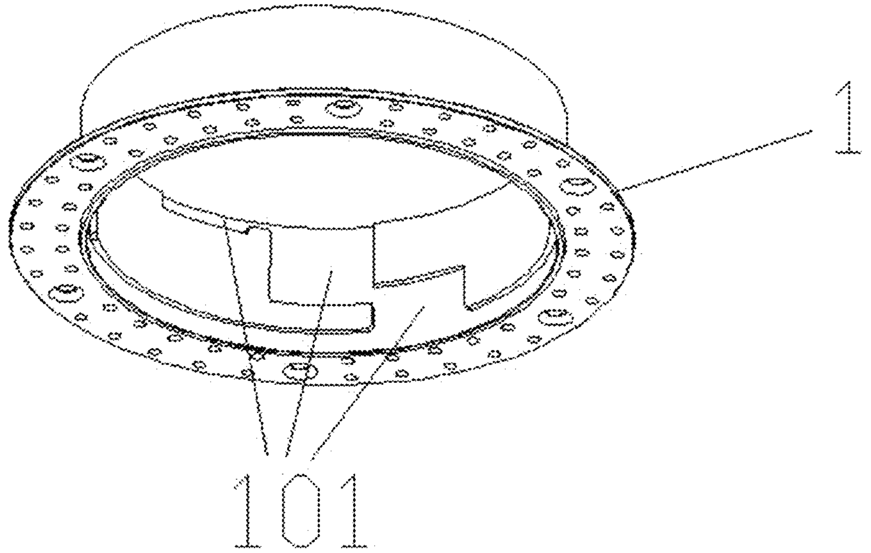
FIG. 8 is a structural diagram of a front ring.
Figure 9:
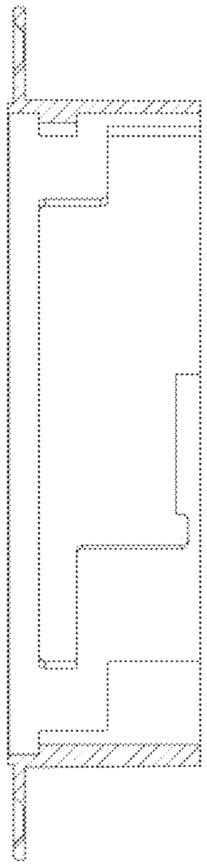
FIG. 9 is a sectional view of a front ring.

Reference numerals: 1: front ring; 101: guide slot; 2, bolt; 3, fixed recessed borderless spotlight module; 301; first wire; 302: first heat sink; 303: first COB lamp bead; 304: first COB holder; 305: first screw; 306: reflective sheet; 307: first lens; 308: first retaining ring; 309: first wire clip; 310: first protrusion; 4: recessed borderless spotlight module with a function of adjusting a light outgoing angle; 401: second wire; 402: second heat sink; 403: second COB lamp bead; 404: second COB holder; 405: second screw; 406: second lens; 407: ball body; 408: second wire clip; 409: reflector cup; 410: O-shaped ring; 411: second retaining ring; 412: second protrusion; and 5: ceiling.

DETAILED DESCRIPTION OF THE EMBODIMENTS

The technical solutions of the embodiments of the present disclosure are clearly and completely described below with reference to the drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Embodiment 1

As shown in FIG. 1 to FIG. 12, an easy-to-mount/dismount recessed borderless spotlight structure includes a front ring 1, and a recessed borderless spotlight module. A guide slot 101 is provided in the front ring 1. The recessed borderless spotlight module includes a fixed recessed borderless spotlight module 3 and a recessed borderless spotlight module 4 with a function of adjusting a light outgoing angle. The recessed borderless spotlight module is configured to rotate along a path of the guide slot 101, and is nested in the front ring 1.

In this embodiment, as shown in FIG. 1 to FIG. 4, the fixed recessed borderless spotlight module 3 includes a first wire 301, a first heat sink 302, a first chip-on-board (COB) lamp bead 303, a first COB holder 304, a first screw 305, a reflective sheet 306, a first lens 307, a first retaining ring 308, and a first wire clip 309. A top of the first wire 301 passes through a wire hole of the first heat sink 302 to extend upward, an extended part of the first wire 301 is clamped by the first wire clip 309 and is locked by the first screw 305, and a bottom of the first wire 301 is soldered with the first COB lamp bead 303 through tin soldering. The first COB lamp bead 303 is pre-fastened to the first COB holder 304 through a clip fastener, the first COB holder 304 is pushed into the first heat sink 302, the first COB holder 304 is locked through the first screw 305, then, the reflective sheet 306 and the first lens 307 are sequentially mounted, and the first retaining ring 308 is snapped into the first heat sink 302, to complete assembling; and a first protrusion 310 is disposed on the first heat sink 302.

In this embodiment, as shown in FIG. 1, and FIG. 5 to FIG. 7, the recessed borderless spotlight module 4 with a function of adjusting a light outgoing angle includes a second wire 401, a second heat sink 402, a second COB lamp bead 403, a second COB holder 404, a second screw 405, a second lens 406, a ball body 407, a second wire clip 408, a reflector cup 409, an O-shaped ring 410, and a second retaining ring 411. A top of the second wire 401 passes through a wire hole of the second heat sink 402, an extended part of the second wire 401 is clamped by the second wire clip 411, and is locked by the second screw 405, a bottom of the second wire 401 is soldered with the second COB lamp bead 403 through tin soldering, the second COB lamp bead 403 is clamped by the second COB holder 404, and the second COB holder 404 is locked by the second screw 405. The second lens 406 is vertically placed in the ball body 407, and the second heat sink 402 is tightened with the ball body 407 through threads. The ball body 407 is vertically placed on the reflector cup 409, and then, the O-shaped ring 410 and the second retaining ring 411 are sequentially sleeved on the ball body 407, and are locked through the second screw 405, to complete assembling. A second protrusion 412 is disposed on the second heat sink 402.

In this embodiment, the first protrusion 310 is configured to rotate a plurality of times along the path of the guide slot 101 of the front ring 1, and the fixed recessed borderless spotlight module 3 is nested in the front ring 1. The second protrusion 412 is configured to rotate a plurality of times along the path of the guide slot 101 of the front ring 1, and the recessed borderless spotlight module 4 with a function of adjusting a light outgoing angle is nested in the front ring 1.

In this embodiment, the ceiling 5 is perforated, the front ring 1 is fastened to the ceiling 5 through a bolt 2, and the front ring 1 is covered and hidden by using decorative paint. In this way, better aesthetic effect can be achieved, and further marking promotion of the spotlight module is facilitated.

Figure 10:
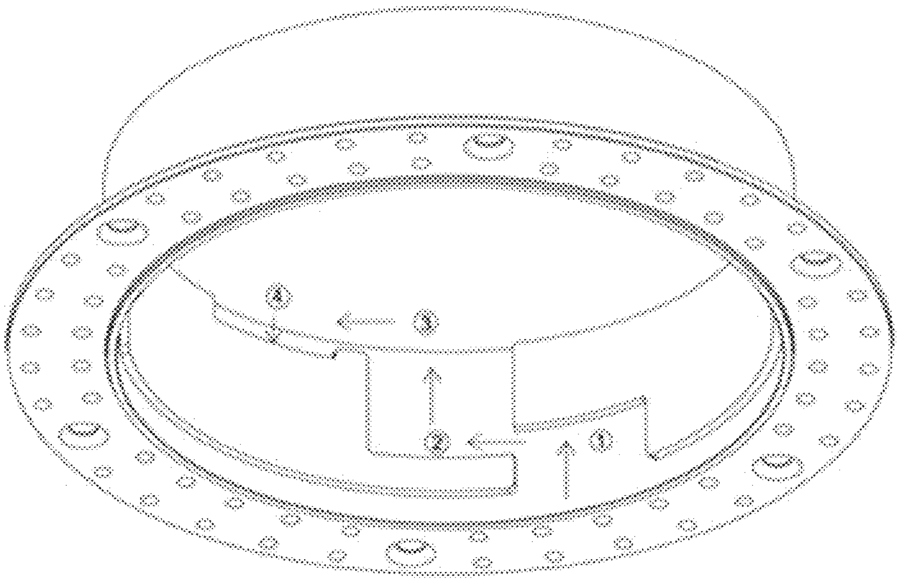
FIG. 10 is schematic diagram of track operation of a path of a guide slot.
Figure 11:
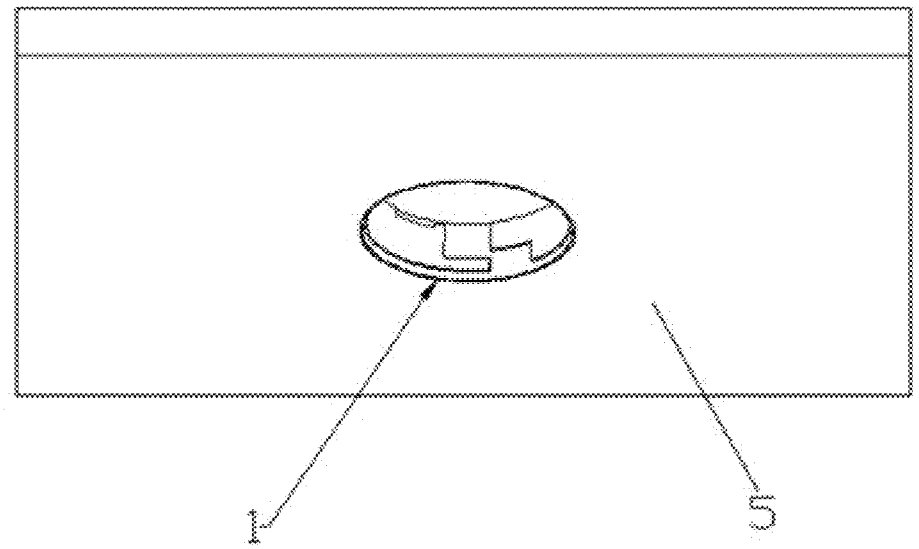
FIG. 11 is a schematic diagram of combination of a front ring and a ceiling.
Figure 12:
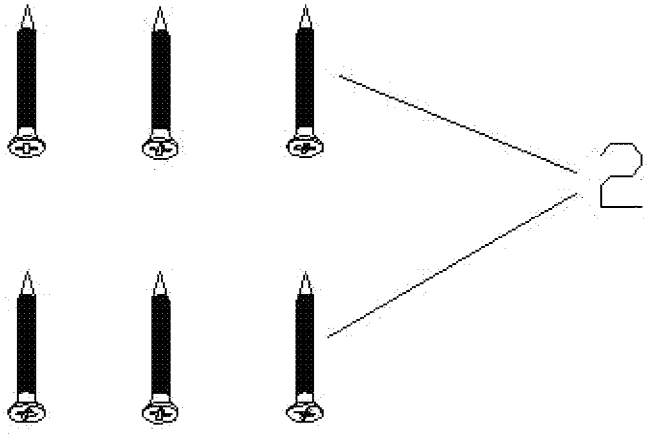
FIG. 12 is a schematic diagram of a bolt.

According to the present disclosure, in specific use, as shown in FIG. 10, the fixed recessed borderless spotlight module 3 or the recessed borderless spotlight module 4 with a function of adjusting a light outgoing angle is upward pushed along a middle position of the front ring 1, allowing the first protrusion 310 or the second protrusion 412 to enter the guide slot 101 of the front ring 1, and reach a position indicated by serial number ① by rotating and upward pushing the spotlight module. Then, the spotlight module is rotated anticlockwise, and stopped at a position at which the spotlight module cannot be rotated. In this case, the first protrusion 310 or the second protrusion 412 reaches a position indicated by serial number ②. The spotlight module is upward pushed until the spotlight module cannot be pushed. In this case, the first protrusion 310 or the second protrusion 412 reaches a position indicated by serial number ③. The spotlight module continues to be rotated anticlockwise and is stopped at a position at which the spotlight module cannot be rotated. In this case, the first protrusion 310 or the second protrusion 412 reaches a position indicated by serial number ④. Then, the spotlight module is released to drop into the guide slot 101 under action of gravity, thereby completing mounting. An operation track of the first protrusion 310 or the second protrusion 412 in the guide slot 101 is indicated by the arrows. The spotlight module can be dismounted through reverse operation.

Embodiment 2

In this embodiment, the recessed borderless spotlight module is die-cast through a die-casting mold. The spotlight module obtained through die-casting is conductive to introduction of heat of an LED, thereby enhancing convection heat exchange with air, and prolonging a service life of a product.

Although the embodiments of the present disclosure have been illustrated and described, it should be understood that a person of ordinary skill in the art may make various changes, modifications, replacements and variations to the above embodiments without departing from the principle and spirit of the present disclosure, and the scope of the present disclosure is limited by the appended claims and legal equivalents thereof.

What is claimed is:

1. An easy-to-mount/dismount recessed borderless spotlight structure, comprising:

a front ring, wherein a guide slot is provided in the front ring; and a recessed borderless spotlight module, wherein the recessed borderless spotlight module is a fixed recessed borderless spotlight module, the fixed recessed borderless spotlight module comprises a first wire, a first heat sink, a first chip-on-board (COB) lamp bead, a first COB holder, a first screw, a reflective sheet, a first lens, a first retaining ring, and a first wire clip, wherein the recessed borderless spotlight module is configured to rotate along a path of the guide slot, and is nested in the front ring, and the recessed borderless spotlight module is upward pushed along a middle position of the front ring; and a top of the first wire is passed through a wire hole of the first heat sink to extend upward, and then the top of the first wire is clamped by the first wire clip and is locked by the first screw, and a bottom of the first wire is soldered with the first COB lamp bead through tin soldering; the first COB lamp bead is pre-fastened to the first COB holder through a clip fastener, the first COB holder is pushed into the first heat sink, the first COB holder is locked through the first screw, the reflective sheet and the first lens are sequentially mounted, and the first retaining ring is snapped into the first heat sink, to complete assembling; and a first protrusion is disposed on the first heat sink;

wherein the first protrusion is configured to rotate a plurality of times along the path of the guide slot of the front ring, and the fixed recessed borderless spotlight module is nested in the front ring; the front ring is configured to fasten the recessed borderless spotlight module onto a ceiling.

2. An easy-to-mount/dismount recessed borderless spotlight structure, comprising:

a front ring, wherein a guide slot is provided in the front ring; and a recessed borderless spotlight module, wherein the recessed borderless spotlight module is a recessed borderless spotlight module with a function of adjusting a light outgoing angle, wherein the recessed borderless spotlight module is configured to rotate along a path of the guide slot, and is nested in the front ring, and the recessed borderless spotlight module is upward pushed along a middle position of the front ring; and the recessed borderless spotlight module comprises a second wire, a second heat sink, a second COB lamp bead, a second COB holder, a second screw, a second lens, a ball body, a second wire clip, a reflector cup, an O-shaped ring, and a second retaining ring, wherein a top of the second wire is passed through a wire hole of the second heat sink, and then the top of the second wire is clamped by the second wire clip and is locked by the second screw, a bottom of the second wire is soldered with the second COB lamp bead through tin soldering, the second COB lamp bead is clamped by the second COB holder, and the second COB holder is locked by the second screw; and the second lens is vertically placed in the ball body, and the second heat sink is tightened with the ball body through threads;

the ball body is vertically placed on the reflector cup, and then, the O-shaped ring and the second retaining ring are sequentially sleeved on the ball body, and are locked through the second screw, to complete assembling; and a second protrusion is disposed on the second heat sink;

wherein the second protrusion is configured to rotate a plurality of times along the path of the guide slot of the front ring, and the recessed borderless spotlight module with a function of adjusting a light outgoing angle is nested in the front ring; the front ring is configured to fasten the recessed borderless spotlight module onto a ceiling.

* * * * *